(12) United States Patent
Dhese et al.

(10) Patent No.: US 11,266,231 B2
(45) Date of Patent: Mar. 8, 2022

(54) ACTUATED HEIGHT ADJUSTABLE OPTICAL TABLE

(71) Applicant: Thorlabs, Inc., Newton, NJ (US)

(72) Inventors: Keith Dhese, Cambridge (GB); Dave Grimwade, Cambridge (GB); Poobalan Subramani, Ely (GB); Lina Arauz, Cambridge (GB)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 17/077,289

(22) Filed: Oct. 22, 2020

(65) Prior Publication Data
US 2021/0112969 A1  Apr. 22, 2021

Related U.S. Application Data

(60) Provisional application No. 62/924,419, filed on Oct. 22, 2019.

(51) Int. Cl.
*A47B 9/00* (2006.01)
*A47B 37/00* (2006.01)
*G05B 19/402* (2006.01)

(52) U.S. Cl.
CPC ............... *A47B 9/00* (2013.01); *A47B 37/00* (2013.01); *G05B 19/402* (2013.01);
(Continued)

(58) Field of Classification Search
CPC .... A47B 9/00; A47B 9/04; A47B 9/08; A47B 2009/043; A47B 2009/046;
(Continued)

(56) References Cited

U.S. PATENT DOCUMENTS 3,917,201 A * 11/1975 Roll ................. G12B 9/08
248/550
6,286,441 B1  9/2001 Burdi et al.
(Continued)

FOREIGN PATENT DOCUMENTS

DE      8813468 U1  2/1989
DE  202013103546 U1  8/2013
(Continued)

OTHER PUBLICATIONS

European Search Report and Opinion issued by the European Patent Office for corresponding European Patent Application No. EP 20203426, dated Feb. 24, 2021.
(Continued)

*Primary Examiner* — Matthew W Ing
(74) *Attorney, Agent, or Firm* — Myers Wolin, LLC (57) ABSTRACT

An actuated, height adjustable optical table or workstation for use in microscopy, optical research laboratories and similar environments includes fixed and moving parts which combine to create a rigid, height adjustable table structure on which to mount an optical breadboard or similar platforms via optional passive or active vibration isolation mounts. The height adjustment is performed by multiple compact actuators with associated control hardware and software, and allows the user or an application system to perform activities with the table at any heights.

17 Claims, 11 Drawing Sheets

(52) U.S. Cl.
CPC ... *A47B 2037/005* (2013.01); *A47B 2200/006* (2013.01); *A47B 2200/0058* (2013.01); *A47B 2200/0061* (2013.01); *A47B 2200/0066* (2013.01); *G05B 2219/50176* (2013.01)

(58) Field of Classification Search
CPC ...... A47B 2200/0058; A47B 2200/006; A47B 2200/0061; A47B 2200/0066; A47B 37/00; A47B 2037/005; G05B 19/402; G05B 2219/50176
See application file for complete search history.

(56) References Cited

U.S. PATENT DOCUMENTS

| | | | |
|---|---|---|---|
| 6,739,153 | B2 | 5/2004 | Davies et al. |
| 7,049,728 | B2 | 5/2006 | Bastholm |
| 7,320,455 | B2 | 1/2008 | Ryaboy et al. |
| 7,480,051 | B2 | 1/2009 | Frank et al. |
| 7,661,292 | B2 | 2/2010 | Buitmann et al. |
| 7,739,962 | B2 | 6/2010 | Zhu et al. |
| 8,231,098 | B2 | 7/2012 | Ryaboy et al. |
| 8,276,873 | B2 | 10/2012 | Ryaboy et al. |
| 8,651,447 | B2 | 2/2014 | Ryaboy et al. |
| 8,807,515 | B2 | 8/2014 | Ryaboy et al. |
| 9,086,112 | B2 | 7/2015 | Ryaboy et al. |
| 9,155,391 | B2 | 10/2015 | Klinke et al. |
| 9,236,817 | B2 | 1/2016 | Strothmann et al. |
| 9,271,567 | B2 | 3/2016 | Wu |
| 9,427,080 | B2 | 8/2016 | Wu |
| 9,546,945 | B2 | 1/2017 | Ryaboy et al. |
| 9,608,557 | B2 | 3/2017 | Clausen et al. |
| 9,723,920 | B1 | 8/2017 | Wu |
| 9,814,306 | B2 | 11/2017 | Köder et al. |
| 9,907,396 | B1 * | 3/2018 | Labrosse ................ A47B 97/00 |
| 9,909,709 | B2 | 3/2018 | Pike et al. |
| 9,955,780 | B2 | 5/2018 | Koch |
| 9,993,068 | B2 | 6/2018 | Lin et al. |
| 10,258,150 | B2 | 4/2019 | Lin |
| 10,349,736 | B2 | 7/2019 | Tseng et al. |
| 10,455,932 | B2 | 10/2019 | Lin et al. |
| 10,470,562 | B2 | 11/2019 | Laing |
| 10,588,401 | B1 | 3/2020 | Lu |
| 10,842,286 | B2 | 11/2020 | Lukas et al. |
| 10,869,547 | B2 | 12/2020 | Lu |
| 10,912,380 | B1 | 2/2021 | Lu |
| 11,044,990 | B2 | 6/2021 | Xiang |
| 2006/0024212 | A1 | 2/2006 | Hwang |
| 2015/0007756 | A1 | 1/2015 | Kollreider et al. |
| 2018/0141050 | A1 | 5/2018 | Ryan et al. |
| 2018/0368569 | A1 * | 12/2018 | Laing .................. A47C 19/024 |
| 2019/0183239 | A1 * | 6/2019 | Semmelrath .......... A47C 20/08 |
| 2019/0191867 | A1 * | 6/2019 | Lin ........................ F16C 3/035 |
| 2019/0261778 | A1 | 8/2019 | Lukas et al. |
| 2019/0365090 | A1 | 12/2019 | Oakley et al. |
| 2020/0072410 | A1 * | 3/2020 | Ren .......................... H02P 1/02 |
| 2020/0146440 | A1 | 5/2020 | Fogarty et al. |
| 2020/0221863 | A1 * | 7/2020 | Laing ....................... A47B 9/04 |
| 2021/0100353 | A1 | 4/2021 | Olesen et al. |

FOREIGN PATENT DOCUMENTS

| | | |
|---|---|---|
| DE | 102012101890 A1 | 9/2013 |
| DE | 202016104512 U1 | 8/2016 |
| DE | 21 2020 000 167 U1 | 5/2020 |
| EP | 2479886 A1 | 7/2012 |
| EP | 2583586 A1 | 4/2013 |
| EP | 2926688 A1 | 10/2015 |
| EP | 3725183 A | 10/2020 |
| WO | 2005040634 A2 | 5/2005 |
| WO | 2009146708 A1 | 12/2009 |
| WO | 2012140085 A1 | 10/2012 |
| WO | 2014146963 A1 | 9/2014 |
| WO | 2016187281 A1 | 11/2016 |
| WO | 2017133729 A1 | 8/2017 |
| WO | 2018210387 A1 | 11/2018 |
| WO | 2018223240 A1 | 12/2018 |
| WO | 2019086071 A2 | 5/2019 |

OTHER PUBLICATIONS

Extended European search report with the European search opinion issued by the European Patent Office for corresponding European Patent Application No. 20208055.2-1005, dated May 6, 2021.

* cited by examiner

ACTUATED HEIGHT ADJUSTABLE OPTICAL TABLE

CROSS REFERENCE TO RELATED APPLICATIONS

This application claims the benefit of U.S. Provisional Patent Application No. 62/924,419 filed on Oct. 22, 2019. The contents of U.S. Provisional Patent Application 62/924,419 are hereby incorporated by reference.

FIELD OF THE INVENTION

The present invention relates to laboratory desks, tables and workstations, and more specifically to actuated height adjustable optical tables with an optional vibration isolation system. This vibration isolation system can be rigid, passive or active, and can be driven pneumatically, electronically, hydraulically, or via other methods.

BACKGROUND

Figure 1A:
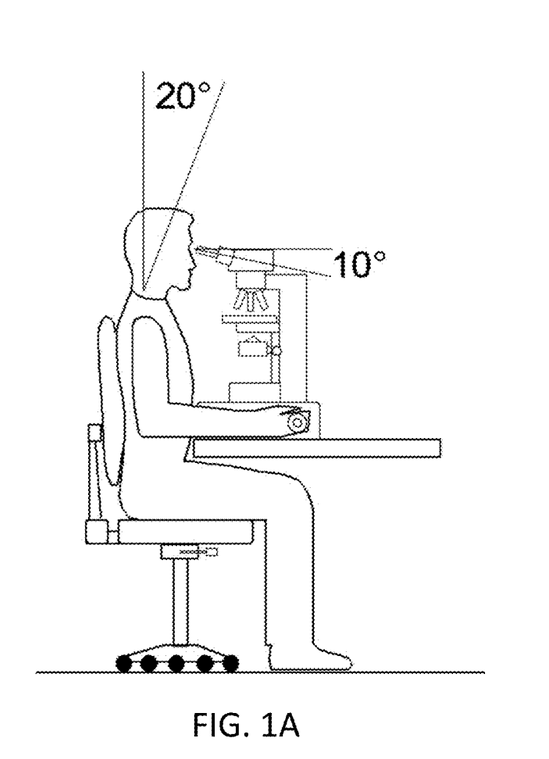
FIG. 1A-FIG. 1D illustrate a wide range of height requirements for an optical table to which equipment is mounted.
Figure 1B:
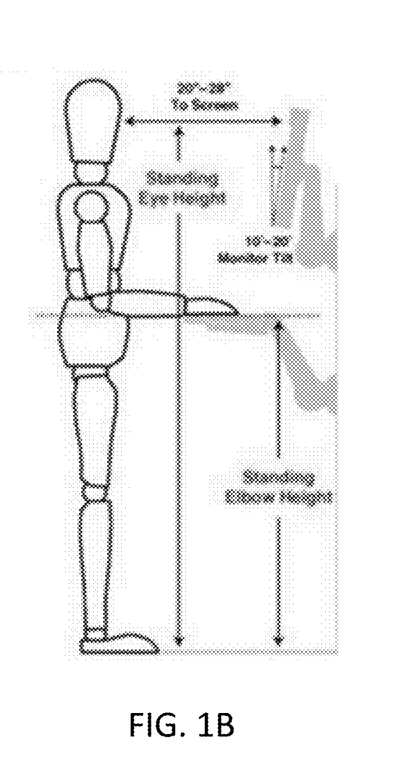
Figure 1C:
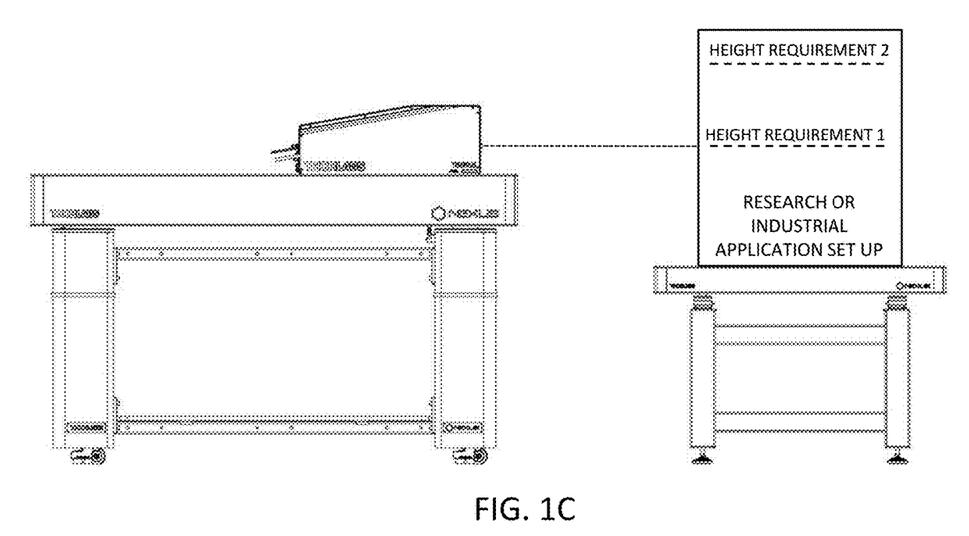
Figure 1D:
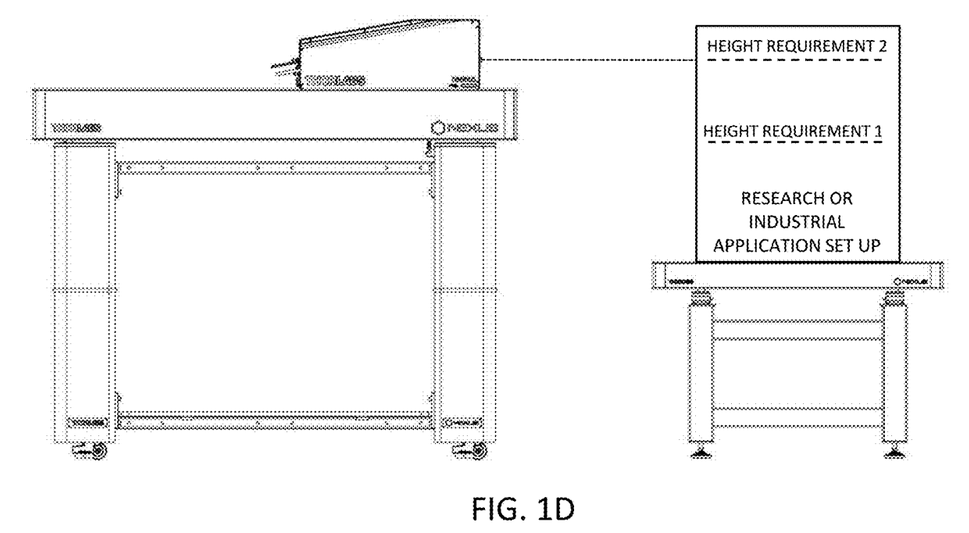

An optical table or workstation is commonly used for mounting microscopy equipment, optical equipment, accessories or similar equipment for use in research laboratories or industrial applications. Existing optical tables or workstations are of fixed heights. For example, the Thorlabs ScienceDesk is currently available in two fixed height versions. However, the varying nature of uses (equipment) and users (anthropometry) creates a wide range of height requirements for the table to which the equipment is mounted. For example, FIG. 1A shows a situation in which a user sits in front of a table and FIG. 1B shows another situation in which a user stands in front of a table. It is clear that the height requirements in FIGS. 1A and 1B are different. Similarly, the optical table or workstation in industrial hands-off applications can require different operating heights as illustrated in FIGS. 1C and 1D. For example, it is often required to alter the beam height of a laser system or other which can be facilitated by the use of height adjustable optical table or workstation.

Figure 2A:
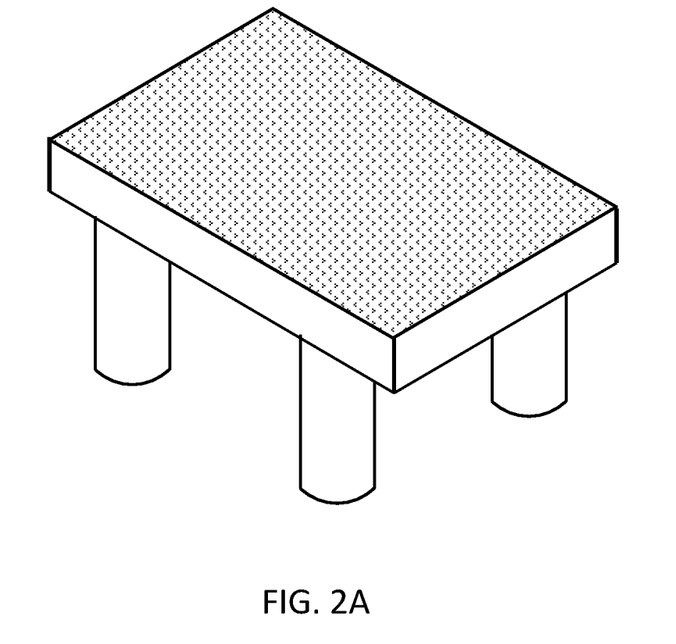
FIG. 2A shows a breadboard with supporting legs.
Figure 2B:
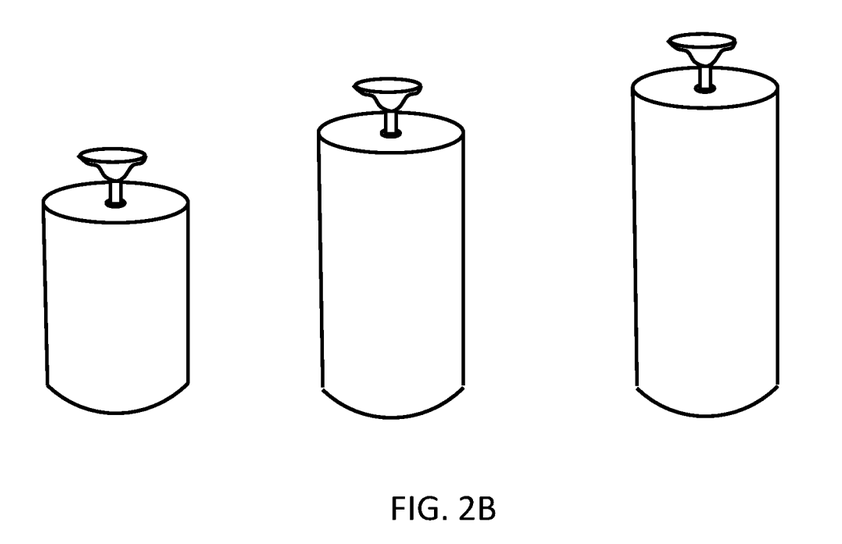
FIG. 2B shows the supporting legs of different lengths.

FIG. 2A shows an optical table with legs of a fixed length, and FIG. 2B shows that different lengths of legs are provided for the table in order to allow for different table heights. In this example, the tabletop is a breadboard supported by legs of one of the available lengths. This makes adjusting the limited table heights in existing products costly and time consuming. Thus, there is a need for a height adjustable optical table or workstation.

Some example requirements for a height adjustable optical table or workstation include: (1) Ensuring the optical breadboard or similar platform remains flat and free from sudden accelerations or decelerations during a height change (thereby preserving the integrity of the apparatus thereon) and thereafter flat and stable at the desired height. (2) Handling the typically higher loads (tons of weight in the general scope) and in a safe manner (i.e., emergency stop unlike office desks).

However, there are no solutions dedicated to raising an optical breadboard or similar platform in the marketplace with or without vibration isolation. Users may employ the use of a 'generic' height adjustable table/platform/columns to perform the same duty, however, vibration isolation will likely be absent unless it is employed in addition to the 'generic' height adjustable solution(s). Furthermore, it is likely the majority of the 'generic' height adjustable tables/platforms will not have the required stiffness to be suitable for use in research laboratories or industrial applications, and they may not have sufficient load capacity.

Therefore, there is a long-felt need for a height adjustable optical table or workstation with optional vibration isolation that is better able to cater for the varied height and/or load requirements of the uses of the equipment in any of the applications in which the optical table or platform is used. A height adjustable optical table or workstation allows a user to raise or lower the optical breadboard or similar platform to any position within the range of travel.

SUMMARY

An embodiment of the present invention is an actuated, height adjustable optical table or workstation for use in research or industrial applications. The height adjustable design includes fixed and moving parts which are combined to create a rigid, height adjustable table structure of any size, on which to mount an optical breadboard or similar platforms of any shape or size. The optical surface can be isolated from vibrations via rigid, passive, active (pneumatically, electronically or otherwise) controlled vibration isolation mounts. The height adjustment is performed by multiple actuators with associated control hardware and software, and it allows the user to control the height of the optical table or workstation to any position.

An embodiment of the present invention is an actuated, height adjustable optical table or workstation for use in research or industrial applications that consists of a plurality of leg subassemblies together with an optical breadboard or similar platform of any shape or size. FIGS. 4A to 4D inclusive illustrate the diverse nature of optical tables or workstations for which alternative configurations of frame, table, leg subassemblies and optical breadboard or similar platform that would benefit from a height adjustable design.

An embodiment of the present invention provides height adjustable optical table or workstation including: a flat surface; a plurality of legs subassemblies configured to support the flat surface, each leg subassembly comprising an actuator configured to extend or retract the length of the leg subassembly; and a processor configured to control the actuators; wherein the processor is configured to control the actuators to synchronously extend or retract the lengths of the plurality of leg subassemblies, such that the flat surface remains level during the extension or retraction.

An embodiment of the present invention provides an optical table including: a base section; a top section; a plurality of legs subassemblies, each leg subassembly including a housing; a actuated actuator fitted in the housing configured to retract or extend with the motion being supported by a number of guide pillars and bearing assemblies; a sensor configured to sense the positions of the actuated actuator in the plurality of leg subassemblies; and a processor configured to control the actuators based on the sensed positions; wherein the plurality of legs subassemblies are configured to have their housings mounted to the base section and to have their corresponding upper section mounted to the top section at their corresponding locations.

Figure 5:
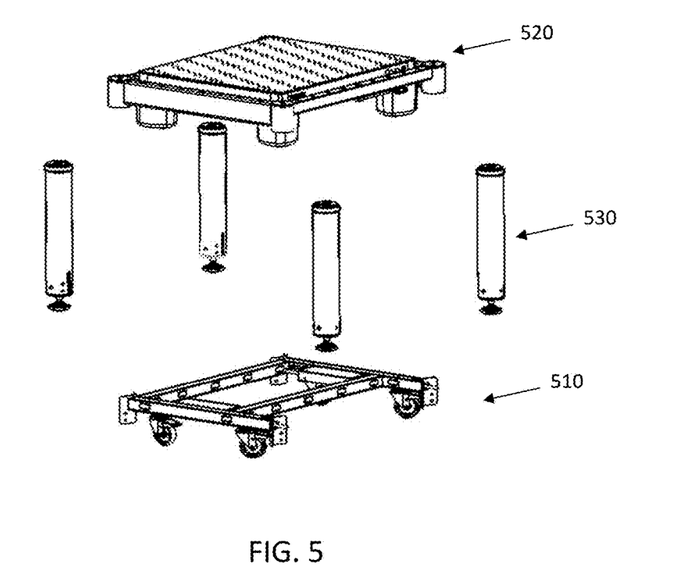
FIG. 5 is an exploded view of an optical table according to an embodiment.

According to one embodiment, the actuated optical table structure has been converted from a fully welded assembly to a partially welded modular structure allowing compact packaging with easily configurable modules. This permits laboratories or similar environments with small entrances access to the largest size of actuated optical tables or workstations. The modular nature of the actuated optical table in accordance with an embodiment of the present invention is shown in FIG. 5.

According to one embodiment, the actuated optical table structure can have the control system or actuators external to the plurality of legs subassemblies or integrated within the leg or optical table structure. This allows flexibility in the design integration depending on the plurality of legs or optical table structure assembly constraints. These options of the present invention are show in FIGS. 7A, 7B, 7C and 7D. FIGS. 7A, 7B, 7C and 7D are for convenience of description only and are not intended to limit the scope of the present invention. For example the control system may drive many more than 4 axes of actuation as required in Optical Table joiner systems.

As shown in FIGS. 2A, 4A-4D and 5, some embodiments of present invention have one or more support frames, and some embodiments do not need any frame. The table and/or legs may be mounted to the support frame in some embodiments.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Height adjustable tables with hydraulic, pneumatic and electrical actuator technology are available, but not in combination with optical tables or workstations. An optical table is a vibration control platform that is used to support systems used for laser- and optics-related experiments, engineering and manufacturing. The surfaces of these optical tables are designed to be very rigid with minimum deflection so that for example the alignment of optical elements remains stable over time. Many optical systems require that vibration of optical elements be kept small. As a result, optical tables are typically very heavy and incorporate vibration isolation and damping features in their structure. Because of the above strict technical requirements, actuated height adjustable optical tables or similar do not exist in the marketplace.

There are no existing solutions that carry the weight of the breadboard, tabletop, platform or surface, and maintain the necessary rigidity for the anti-vibration mounts to work well. The present disclosure provides a solution based on a synchronized actuator movement, from an integrated or external control system with soft start and soft stop, integrated or external to a rigid table/platform/chassis/legs which has the option of vibration isolation should the user desire.

An object of an embodiment of the invention is to provide height adjustment of the optical tables or workstations in order to compensate for the varying requirements of the user or applications. This description is not intended to be understood in a limiting sense, but provides an example of the invention presented solely for illustrative purposes by reference to the accompanying drawings to advise one of ordinary skill in the art of the advantages and construction of the invention.

Figure 3A:
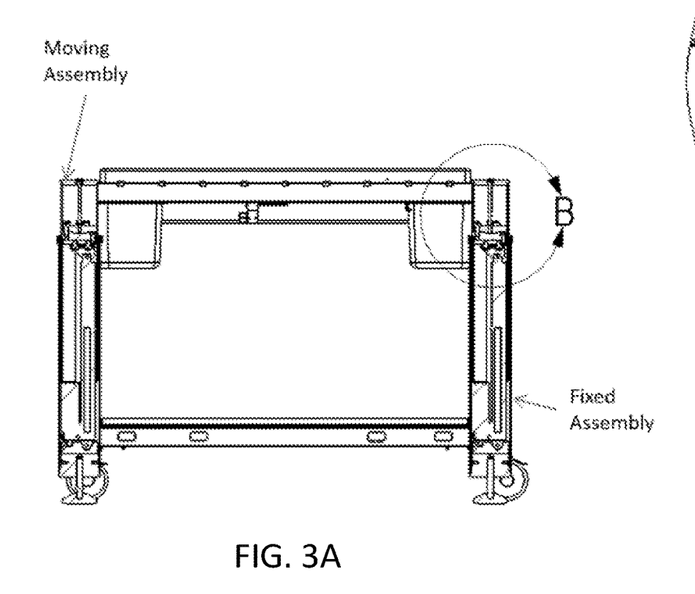
FIG. 3A shows the connection between the moving and fixed assemblies.
Figure 3B:
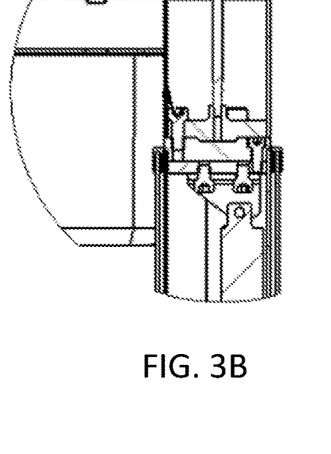
FIG. 3B shows the details of the connection according to an embodiment.
Figure 4A:
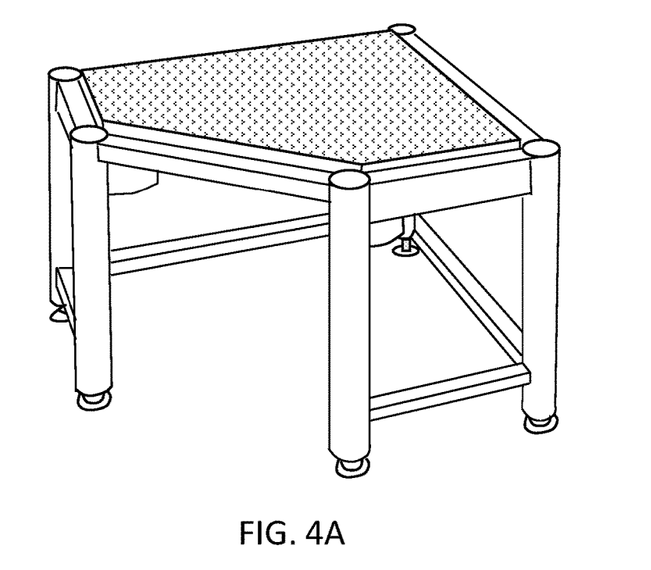
FIGS. 4A-4D show example configurations of optical tables according to various embodiments.
Figure 4B:
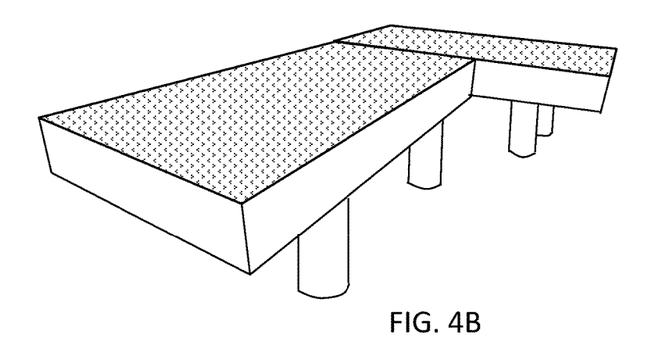
Figure 4C:
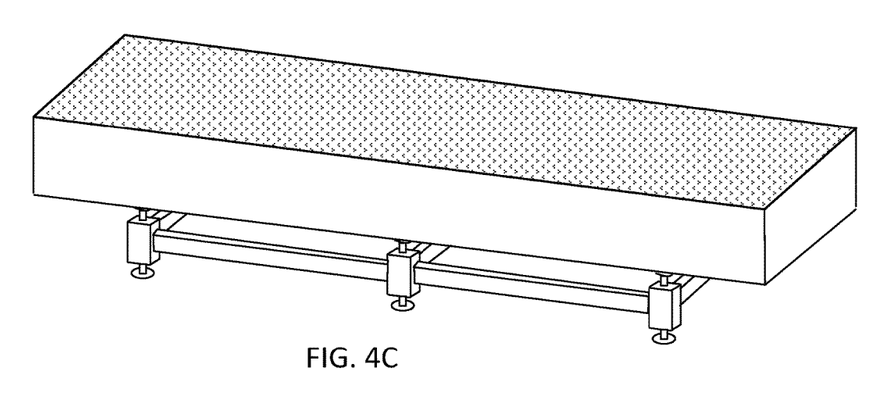
Figure 4D:
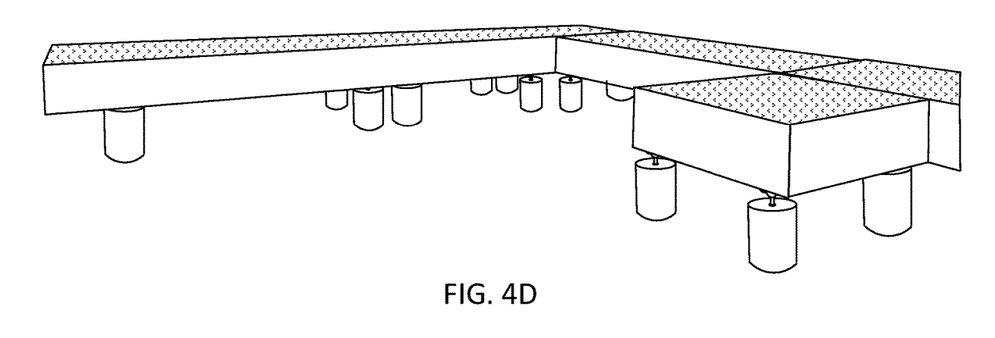

In one embodiment, the optical table includes fixed and moving assemblies to provide the height adjustment as shown in FIG. 3A. FIG. 3B shows the details of the fixed and moving assemblies fitted with suitable connectors, couplers and/or mounting hardware for assembling according to an embodiment. Note that, although example embodiments discussed with a table having 4 legs as an illustrative example, the number of legs may be more than 4 or less than 4. The number of legs depends on the geometry and/or load requirements of the table, as shown in FIGS. 4A-4B. Furthermore, in some embodiments, a number of optical tables are arranged together to provide, for example, an extended optical path for a laser system. For example, in FIGS. 4B and 4D, different optical elements may be mounted on different optical tables. In one embodiment, the height adjustments among the optical tables can be coordinated among their processors or managed by a central controller so that the heights among the tables are adjusted synchronously. In one embodiment, the processors or the central controller is configured to control the actuators, so that an optical axis alignment between two optical elements sitting on two different tables remains aligned before, during and after the height adjustment. In another embodiment, the processors or the central controller is configured to control the actuators, so that for example two optical elements sitting on two different tables have their original alignment offset by a distance in a controlled manner.

As shown in FIG. 5, the optical table or workstation includes a base section 510, a top section 520 and four leg subassemblies 530 in each corner of the table which provide actuation for the height adjustment. It is contemplated that the optical table or workstation may use any types of leg subassembly that can have its length changed by an actuator. However, for simplicity purposes, specific embodiments are used herein to explain various aspects of the present invention, and they are not intended to limit the scope of the present invention.

Figure 11:
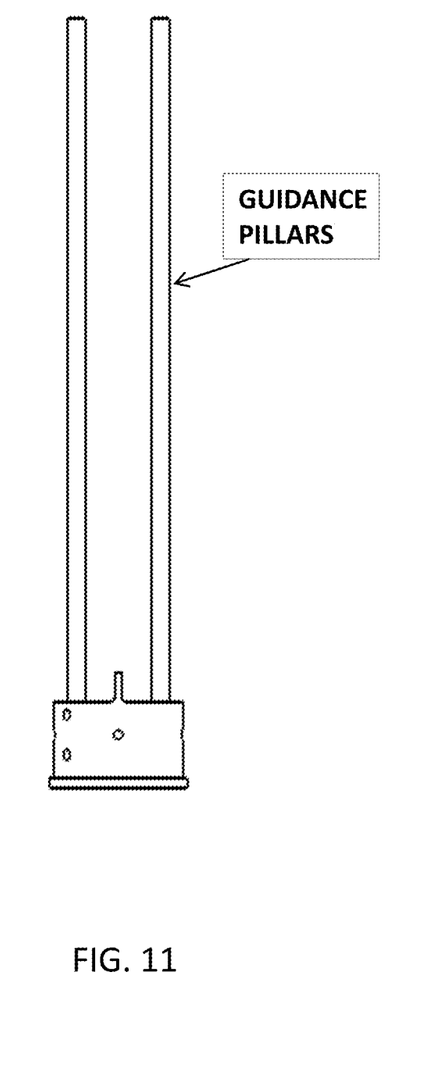
FIG. 11 shows the guidance pillars of a lower guidance assembly according to an embodiment.

In one embodiment, each of the leg subassembly includes a housing which is to be mounted to the base part of the optical table at one of the four corners. An actuator is embedded in each of the leg subassemblies. The actuator is able to extend and retract with the motion being supported by a number of guide pillars mounted to a rigid element within the table leg as shown in FIG. 11 and corresponding upper moving tubes containing linear bearings mounted to the lifter assembly, see FIG. 8. It is understood that the base section, top section, and leg subassemblies are fitted with suitable connectors, couplers and/or mounting hardware for assembling. Furthermore, by selecting a suitable length and travel range of the actuators, the optical table may be customized for specific table height adjustment ranges per user requirements.

In one embodiment, a control system includes a processor that controls the actuators in the leg subassemblies. When energized, the actuator within each leg subassembly extends in length, guided by the linear rails and bearings up to the maximum actuator extension. In one embodiment, each of the four legs extends in synchronization via a user remote or interface device connected to the controller or processor. The user may position the table legs at any position in between the minimum and maximum actuator stroke lengths, being limited only by the minimum incremental movement capability of the control system. In one embodiment, a research or industrial application set up, the height of the table is adjusted based on a programmed process or a predefined condition. The research or industrial application system may provide height adjustment commands to the controller or processor via a system interface. In one embodiment, the adjustable table has a teach function to store user's previously adjusted heights and/or predefined heights in a memory coupled to the controller or processor, so that the user may return the table to a previously adjusted height or one of the predefined heights with a command via the user remote or interface device. In one embodiment, a sensor is configured to sense the position/extension of the shafts in the plurality of leg subassemblies. The processor uses the sensed signal to provide a closed loop control of the actuator, so that the table remains level before, during and after a height adjustment. In one embodiment, the minimum and maximum stroke length of the actuators are controlled by sensors integral into the linear actuator. The control system can be external or integrated within the plurality of the leg subassemblies. Similarly, the sensing mechanism can be via an external sensor or internal electronic monitoring within the control system.

Figure 6A:
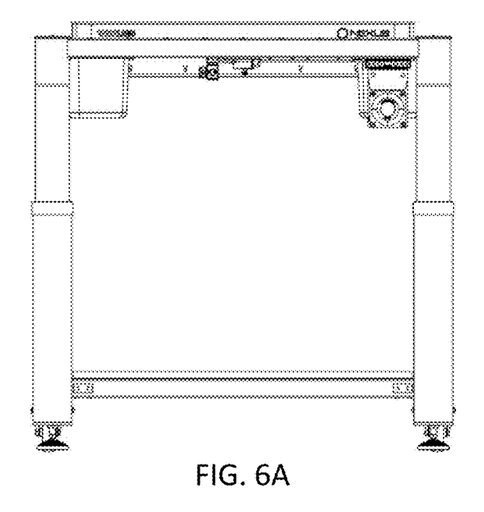
FIG. 6A shows an optical table at its fully extended state and FIG. 6B shows a rigid table with no height adjustment according to an embodiment.
Figure 6B:
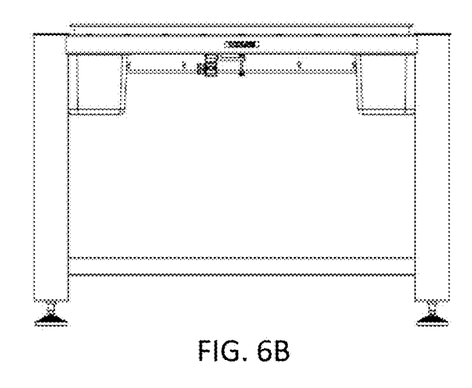

FIG. 6A illustrates the situation where the height of the table is maximum when the legs are fully extended and FIG. 6B illustrates a rigid table with no height adjustment illustrating the extended application range of an adjustable optical table or workstation.

In one embodiment, the acceleration and deceleration of the actuators are controlled by the controller or processor to minimize disturbances to the table and its contents as the height is adjusted (soft start/soft stop). In one embodiment, the actuators are low noise actuators to minimize disturbances to other users while the table is adjusted. In one embodiment, the actuators are low vibration actuators to minimize disturbances to the table content during height adjustment.

Figure 7A:
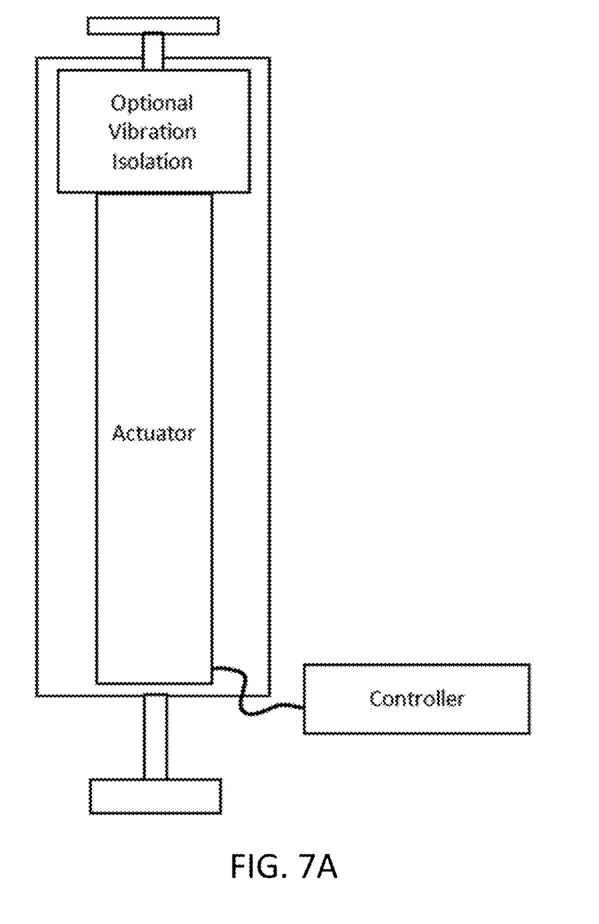
FIGS. 7A-7D show example configurations of control system and actuator placement according to various embodiments.
Figure 7B:
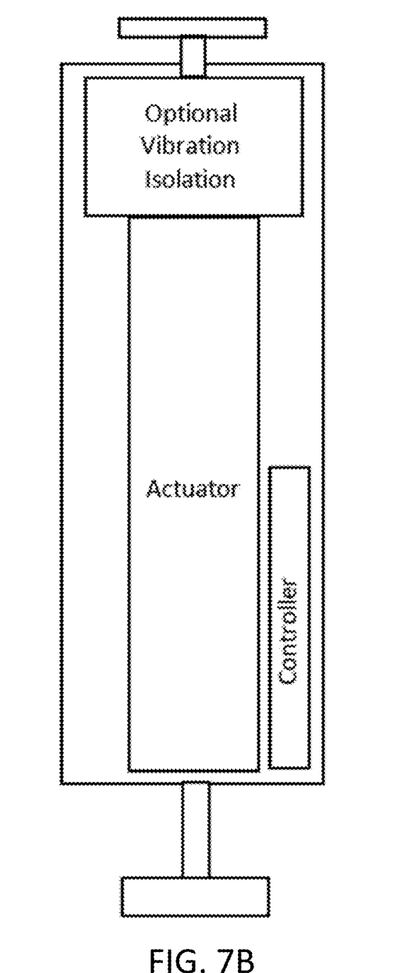

In one embodiment, each of the leg subassemblies includes a linear actuator, the fixed portion of which is mounted to a rigid element within the table leg. Linear guides and linear bearings running parallel to the direction of actuator extension provide support to the moving part of the leg subassembly, resisting any side loads that may result from uneven loads on the table or torsion that may result from the reaction of the actuator. In one embodiment, the controller is external to the leg subassembly as shown in FIG. 7A. In other embodiments the leg subassemblies could also incorporate the vibration isolation system and control system within its footprint. A conceptual view of this shown in FIG. 7B. In other embodiments the actuators may be external to the leg subassemblies with either integrated or external control systems. A conceptual view of these configurations is show in FIG. 7C and FIG. 7D.

Figure 8:
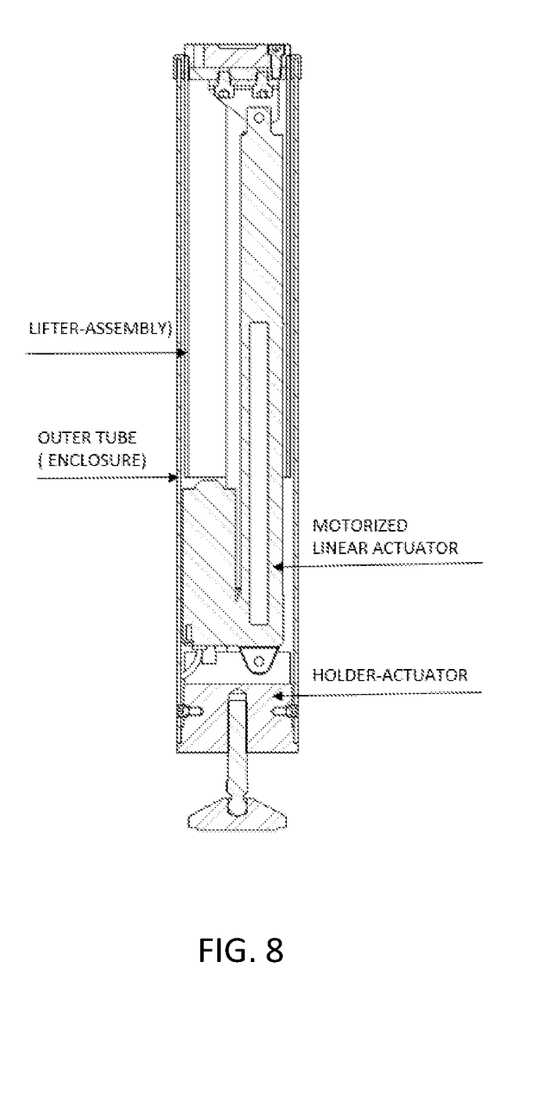
FIG. 8 is a cross-section view of a leg subassembly according to an embodiment.
Figure 9:
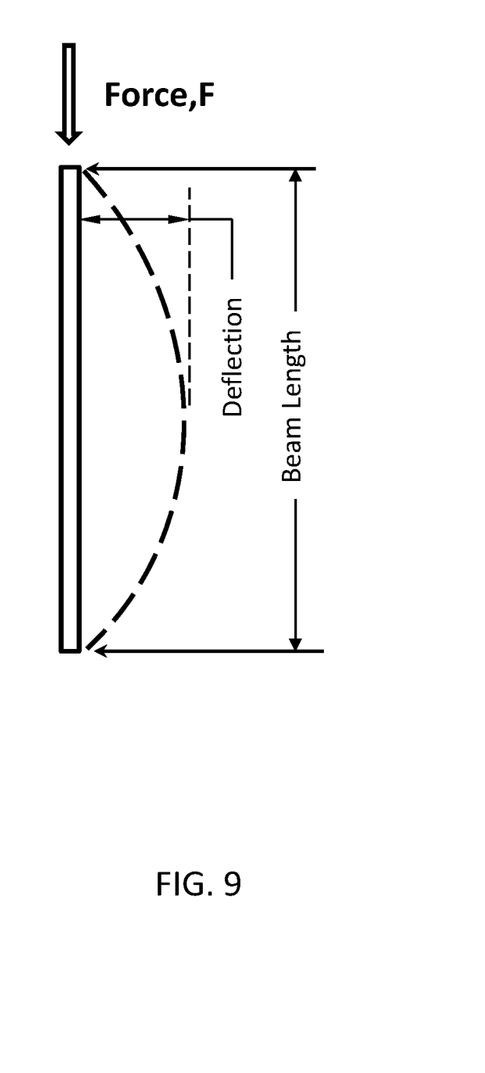
FIG. 9 shows the forces involved when a leg is extended under load according to an embodiment.

FIG. 8 shows a cross-sectional view of a leg subassembly according to one embodiment. As shown in FIG. 9, when a leg is extended under load, axial or a side load may be exerted to the extended beam length, resulting in deflection. In one embodiment, a guidance system has been incorporated in the actuator design in order to prevent the actuator component(s), i.e., lead screw directly imposed to the axial or side load during heavy load placement on the optical table or similar platform and prevent it from distortion and bent in principle. Hence it prevents considerable damage to the core mechanism used in the design.

It also helps to move the lifter assembly to move vertically up and downwards inline to the axis of movement. In one embodiment, the actuators are rack-and-pinion-type actuators. The actuators are configured to prevent back driven if power to the motorized actuator is lost, so that the height of the table is maintained. In one embodiment, the actuator includes a locking mechanism, such that when a desired table height is reached, the actuators are locked in place from further movement. In other embodiments, the actuators are pneumatic, hydraulic, screw threads, or direct drive actuators, and some actuators are with cross links (i.e., scissor-based lift).

Figure 7C:
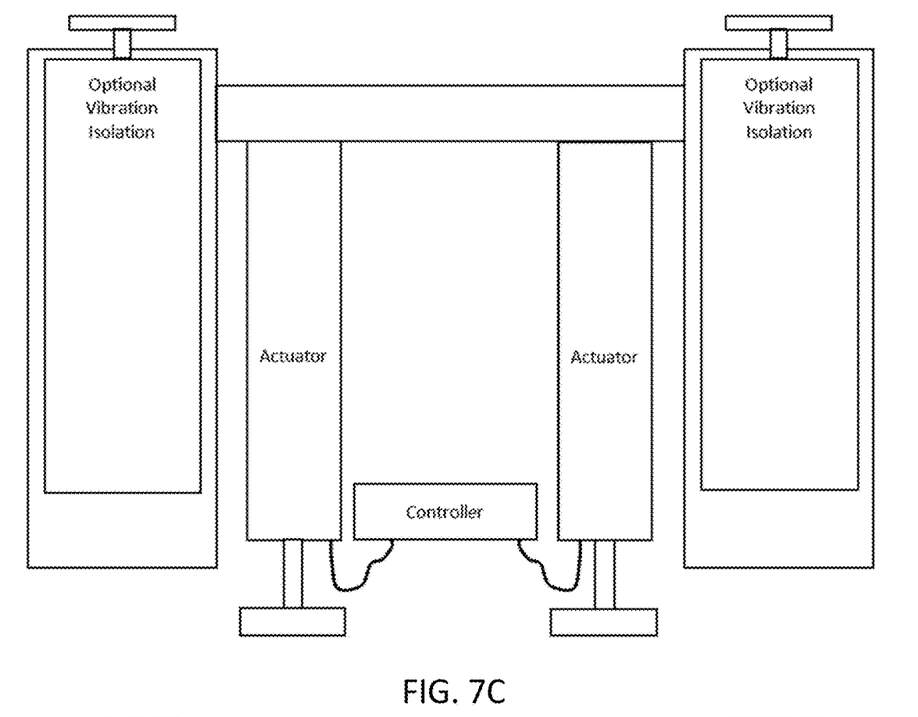
Figure 7D:
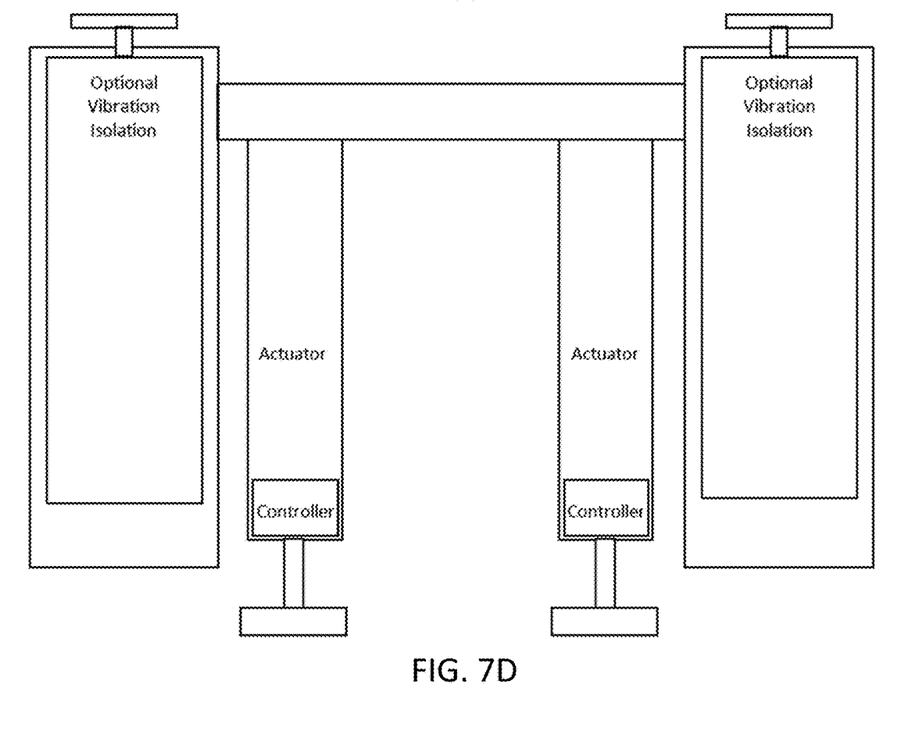
Figure 10:
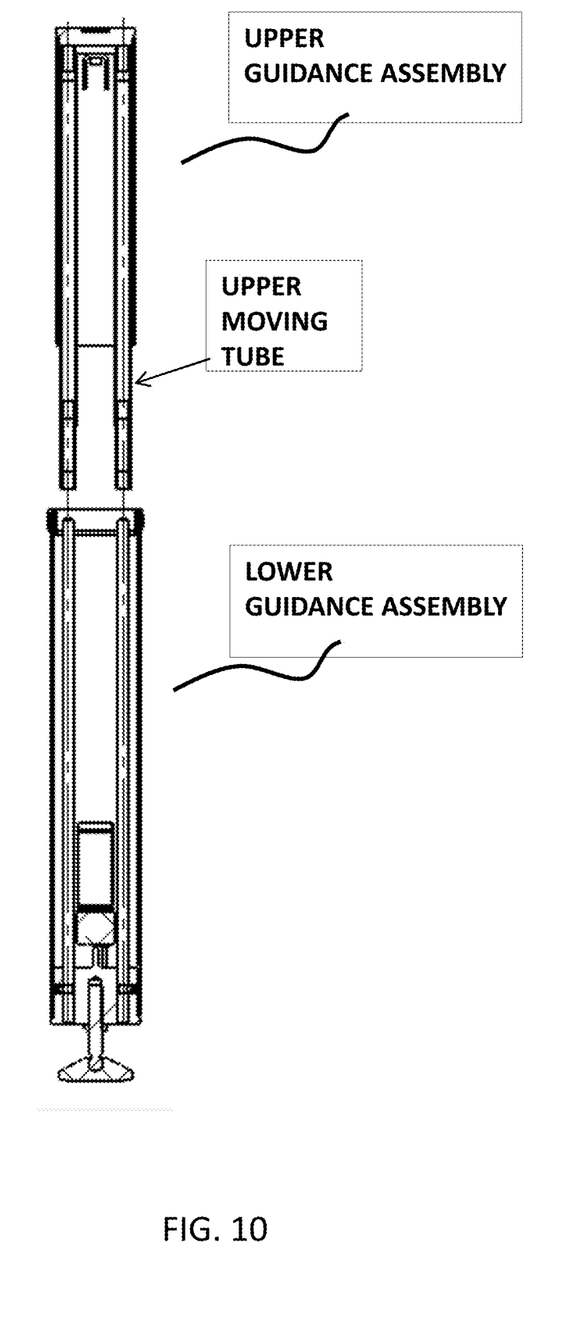
FIG. 10 shows the upper and lower assemblies of a guidance system according to an embodiment.
Figure 12:
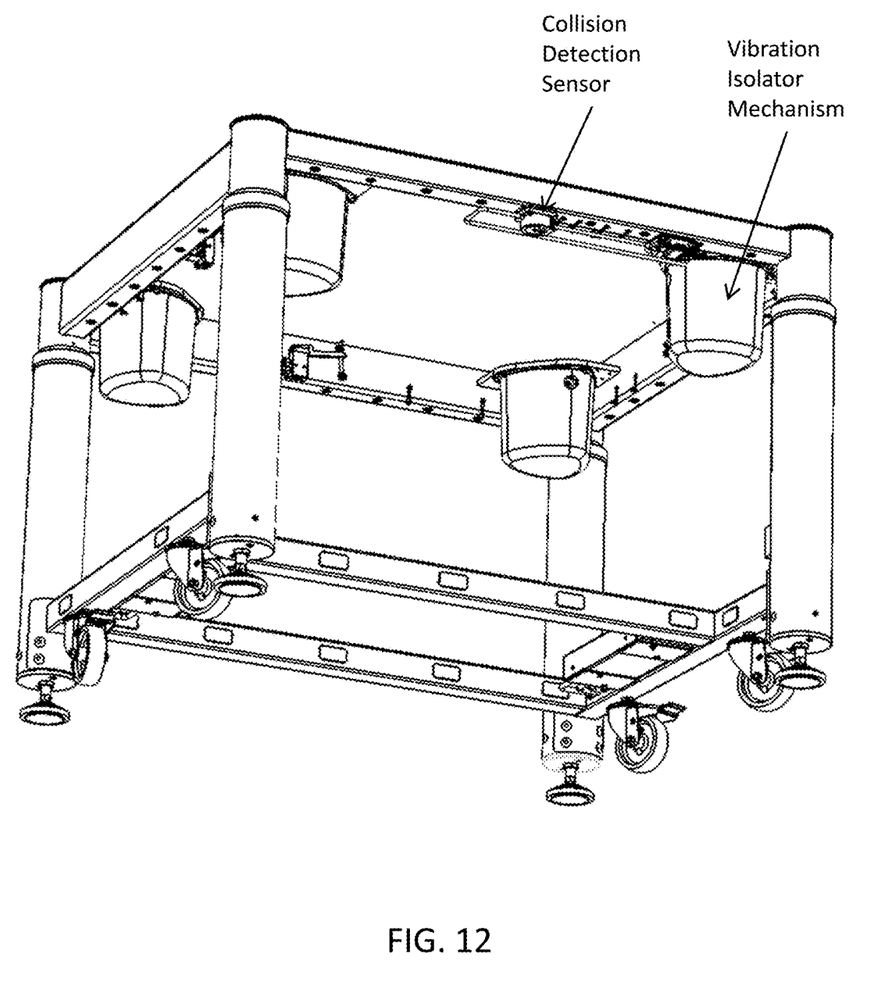
FIG. 12 shows the collision detector sensor and vibration isolator mechanism according to an embodiment.

FIG. 10 shows the guidance system with the upper guidance assembly being fitted to the lower guidance assembly according to an embodiment. The guidance system includes a lower guidance assembly having one or more pillars as shown in FIG. 11 and an upper guidance assembly having one or more corresponding tubes that are sized to fit the one or more pillars as shown in FIG. 12. The system is configured to have the guiding tubes or sleeves fitted in the upper assembly which slides over the lower guide assembly during the table surface moving up or downwards. In one embodiment, the guide system has guide pillars made up of stainless steel that is fixed in the solid locator in precisely bored holes in the locator with a locking provision that prevents the guide pillars moves out from its position. In other embodiments the actuator and guide system could be external to the leg subassembly providing additional space inside the leg subassembly to maintain the integrity of the optional isolation systems. FIGS. 7C and 7D show conceptual views of these configurations.

To be useful, the surface on which an optical system is mounted must satisfy several basic requirements. First, it must provide a rigid base on which optics can be mounted and aligned reliably with long-term stability and no inherent vibrational resonances. It must not only successfully damp any vibrations caused by motorized or moving parts in the experiment, preventing these vibrations from influencing critical optical elements, but also isolate the experiment as a whole from ambient background laboratory vibrations. FIG. 12 shows an optical table fitted with an optional vibration isolator mechanism according to an embodiment.

FIGS. 7A-7D also show different implementation of the vibration isolation according to various embodiments.

It is contemplated that the optical table or workstation may use any types of vibration isolation mechanism. However, for simplicity purposes, specific embodiments are used herein to explain various aspects of the present invention, and they are not intended to limit the scope of the present invention.

In one embodiment, the optical table includes passive vibration isolation optical table supports. These reinforced rubber air chamber isolators provide simple and effective passive vibration isolation with excellent stability. The closed pneumatic isolation system can be inflated with a foot pump or some other source of compressed air. The table is supported by the air pressure in the chamber, which can be adjusted to compensate for a change in the load placed on the optical table. These isolators do not require a constant source of compressed air to maintain isolation. If the pneumatic isolation system is depressurized, the optical table will remain securely supported on and slightly isolated by the reinforced rubber air mount of the optical table supports.

In one embodiment, the optical table includes active vibration isolation optical table supports containing an isolation system that effectively isolates the optical table from vertical and horizontal vibrations. The vertical vibrations are isolated from the optical table by a dual-chamber pneumatic isolation system that requires a constant source of compressed air, such as an air compressor. The table is supported by the air pressure in these chambers. Floor or tabletop motion forces air to flow from one chamber to the other through a laminar flow damper. This restriction of airflow damps oscillatory motion between the floor and the table. The horizontal vibrations are isolated from the optical table by mounting the vertical isolation system on a damped, vibration-absorbing suspension system.

In one embodiment, the optical table includes active vibration isolation using electronic control loop systems (of appropriate bandwidth) in which one or more vibration measurement sensor(s) (e.g. strain gauge, accelerometer, etc.) is used to control one or more suitably responsive actuator(s) (e.g. piezo, motor actuator, etc.) in order to damp out vibrations in one or more axes of translation or rotation.

In one embodiment, the optical table includes active and tuned damping that effectively eliminates structural modes and harmonics of the optical table and reduces resonant frequencies.

When adjusting the height of the optical table, it is contemplated that a moving part of the optical table may collide with a stationary object. In one embodiment, the height adjustable optical table includes a collision detection system to detect a collision or imminent collision during the height adjustment (up or down) and to stop the power to the actuators or momentarily reverse the direction of actuation. In one embodiment, the collision detection system generates an audio and/or visual signal to alert the user of a collision or imminent collision. In one embodiment, the collision detection system includes a sensor connected to the actuator controllers. It is understood that the sensor may be any type of sensors suitable for detecting either an obstacle in a path of a moving part of the optical table or detecting a collision caused by the moving part of the optical table. For example, the sensor may be an optical sensor, touch sensor, limit switch sensor, proximity sensor, sonar sensor, accelerometer sensor, gyroscopic sensor, etc. FIG. 12 illustrates an optical table fitted with a collision detector sensor according to an embodiment.

It is understood that some embodiment may use a variety of optical platforms such as optical tables or breadboards of various materials, sizes, shapes and constructions and granite (or similar) block of various shapes and size.

Some embodiments of the present invention have the following unique advantageous over existing optical tables:

Compact height adjustable optical table.

Complete solution that can be specified at the time of order with height adjustment and optional vibration isolation suitable for use in an optical laboratories or industrial applications.

Solution able to adapt its height to the demands of the user or application.

Low audible noise actuators (can facilitate measurements as the height is adjusted).

High load capacity.

Multiple vibration damping solutions.

Safety features such as emergency stop and collision detection.

Rigidity.

Teach positions—through use of electronically stored teach positions, different experimental heights can be easily returned to avoiding the need for unnecessary additional optics.

Electrical interfacing to allow, for example third party control system, closed loop operation of the platform height.

Although the various embodiments discussed above relate to optical table or workstation, they are not intended to limit the scope of the present invention. It is contemplated that the embodiments are also applicable to other types of tables or platforms in various laboratory environments, industries or specific application settings that have similar height adjustable requirements discussed above.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A height adjustable optical table or workstation for use in research or industrial applications, comprising:
   a flat surface;
   a plurality of legs subassemblies configured to support the flat surface, each leg subassembly comprising an actuator configured to extend or retract the length of the leg subassembly;
   a processor configured to control the actuators; and
   a passive or active vibration isolator coupled to at least one of: the flat surface, and the leg subassemblies;
   wherein the passive or active vibration isolator is configured to isolate vibrations caused by ambient background;
   wherein the processor is configured to control the actuators to synchronously extend or retract the lengths of the plurality of leg subassemblies, such that the flat surface remains level during the extension or retraction.

2. The height adjustable optical table or workstation of claim 1, wherein the actuator are rack-and-pinion-type actuators, motorized actuators; pneumatic actuators, hydraulic actuators, screw threads actuators, or direct drive actuators.

3. The height adjustable optical table or workstation of claim 1, wherein the actuator is integrated in the leg subassembly.

4. The height adjustable optical table or workstation of claim 1, wherein the actuator is external to the leg subassembly.

5. The height adjustable optical table or workstation of claim 1, wherein the processor is integrated in the leg subassembly.

6. The height adjustable optical table or workstation of claim 1, wherein the processor is external to the leg subassembly.

7. The height adjustable optical table or workstation of claim 1, further comprising a sensor configured to sense the extension or retraction position of the plurality of leg subassemblies.

8. The height adjustable optical table or workstation of claim 7, wherein the processor uses the sensed positions to provide a closed loop control of the actuator, so that the table remains level before, during and after a height adjustment.

9. The height adjustable optical table or workstation of claim 1, wherein the processor is further configured to control an acceleration and deceleration of the extension and retraction movements.

10. The height adjustable optical table or workstation of claim 1, wherein the processor is further configured to avoid unbalanced operation by stopping the height adjustment operation when the processor detects a power interruption or a fault in any of the actuators.

11. The height adjustable optical table or workstation of claim 1, further comprising an input device coupled to the processor, the input device being configured to receive inputs for height adjustments.

12. The height adjustable optical table or workstation of claim 1, further comprising a collision sensor configured to detect an obstacle in a path of a moving part of the optical table or workstation during a height adjustment, or to detect a collision caused by the moving part of the optical table or workstation.

13. The height adjustable optical table or workstation of claim 1, wherein each of the plurality of legs subassemblies comprises a housing, a shaft within the housing, the shaft being supported by a number of guide pillars and bearing assemblies, and the actuator is configured to extend or retract the shaft relative to the housing.

14. The height adjustable optical table or workstation of claim 1, wherein each of the leg subassembly further comprises a guidance system configured to maintain the movement of the actuator in the vertical direction.

15. The height adjustable optical table or workstation of claim 14, wherein each of the guidance system comprises a first guidance part having one or more pillars and a second guidance part having one or more corresponding tubes that are sized to fit the one or more pillars, such that the first guidance part can slide relative to the second guidance part.

16. An assembly of optical tables or workstation comprising a plurality of height adjustable optical tables according to claim 1, wherein the processor of one of the plurality of height adjustable optical tables is configured to perform a height adjustment in synchronous with a height adjustment by the processor of at least one other of the plurality of height adjustable optical tables.

17. The height adjustable optical table or workstation of claim 1, wherein the plurality of leg subassemblies are mounted to one or more support frame.

* * * * *